United States Patent Office 2,769,956
Patented Nov. 6, 1956

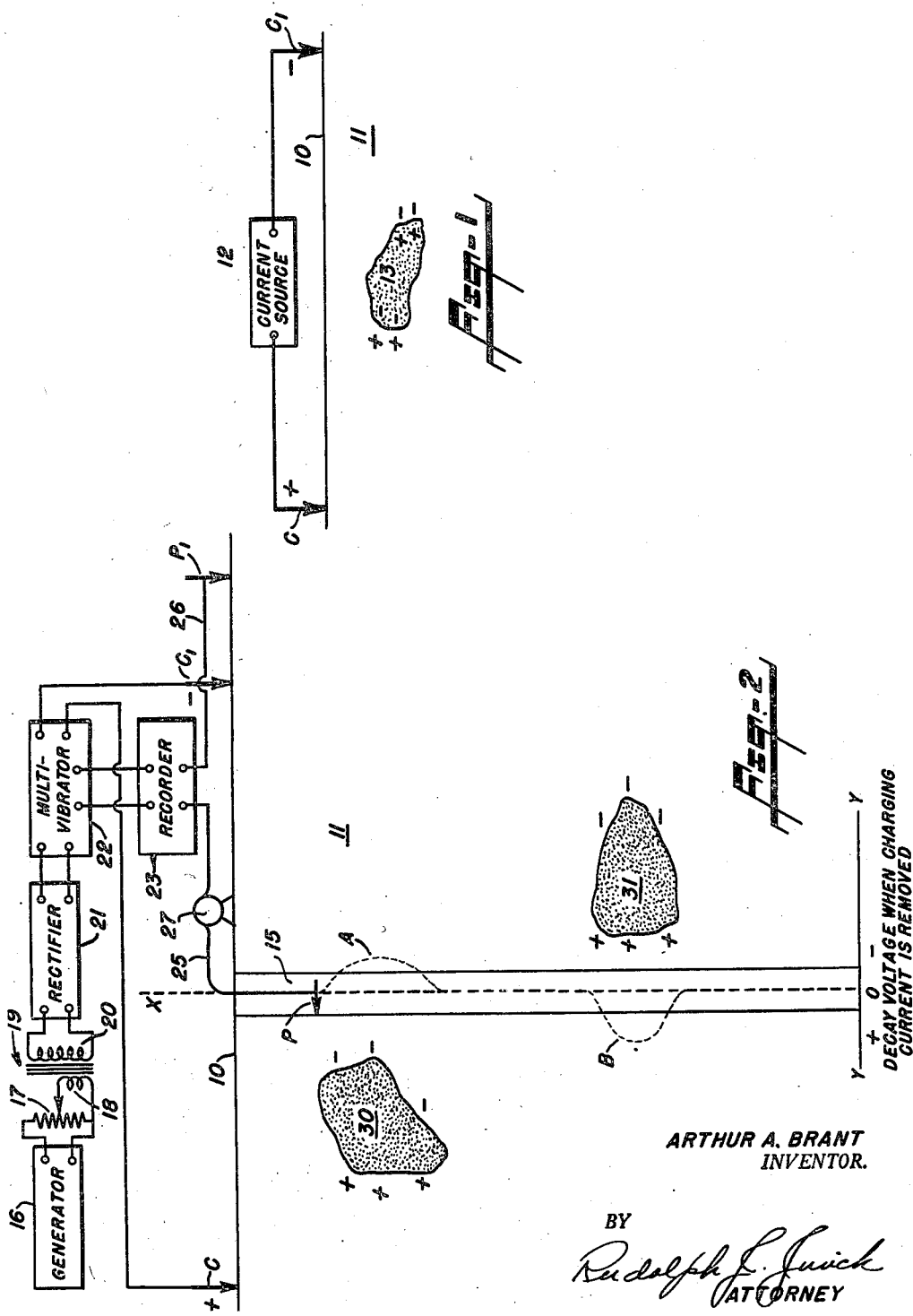

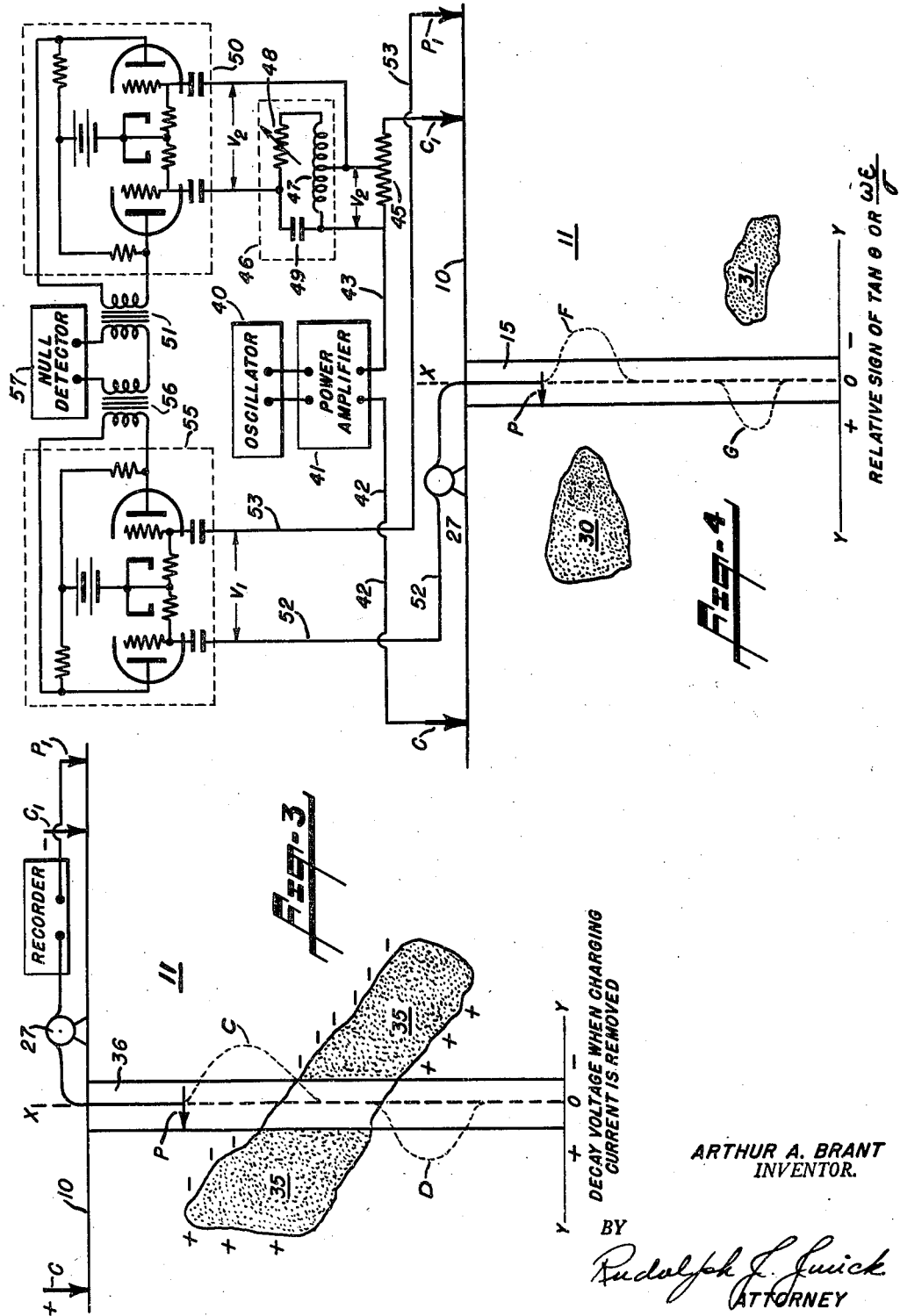

2,769,956

METHOD AND APPARATUS FOR DETERMINING THE AZIMUTH AND DIP OF SULPHIDE DEPOSITS

Arthur A. Brant, Clarkdale, Ariz., assignor to Newmont Mining Corporation, New York, N. Y., a corporation of Delaware Application October 4, 1954, Serial No. 460,214

11 Claims. (Cl. 324—1)

This invention relates to a method of, and apparatus for, geophysical exploration and more particularly to a novel method for determining the azimuth and dip of a disseminated sulphide deposit relative to a drill hole.

When metallic sulphide particles, e. g. chalcopyrite, galena, pyrite, etc., are present in a rock medium containing an electrolyte, double layer charge effects develop on the sulphide particle surfaces when a direct current is passed through the medium. In "Textbook of Physical Chemistry," Glasstone, published by D. Van Nostrand, April, 1946, pages 1017–1022, refer to the double layer of charge arising at a metal electrode surface in an electrolytic solution and resulting in overvoltage effects on the passage of current. In the particular case of the cathode a negative layer of charge is presumed next to the cathode, with a positive layer of charge in the solution immediately adjacent. When current flows through a sulphide particle the entrant area acts as a cathode and the emergent areas as an anode and, therefore, the particle develops double layers of charge. These double layer effects are such that the positive charge of the double layer is nearer the positive earth current electrode and the negative charge of the double layer is nearer the negative earth current electrode. Thus, these double layer charge effects hinder or offer an impedance to the normal flow of the current through the medium. This phenomenon is known as the overvoltage effect. The overvoltage effect develops when the charging current flowing through the medium is a direct, or unidirectional, current and also when such charging current is of an alternating character.

In the latter case, at a relatively low frequency, the one current electrode remains positive for a significant period of time and during this time the double layer or overvoltage effects will build up on the metallic sulphide particles and will offer an apparent impedance to the flow of the charging current. Thus, an aggregate of scattered sulphide particles in a rock medium, at low current frequencies, will develop double layer charge effects that act just like small condensers and create a voltage drop that is out of phase with the charging current. The decaying overvoltages are effective on the next half cycle of current but by the principle of superposition a steady value of phase relation of current and voltage drop will be reached after 4 or 5 cycles. Actually, the overvoltage effects decay with time constants of the order of $\frac{1}{10}$ second and are related to the time duration of the charging current or the time period of the alternating current.

In the usual arrangement wherein the charging current is caused to flow through the medium by means of a pair of current electrodes inserted into the ground at spaced points, the double layer charge effects are made manifest by means of a resultant potential appearing across a pair of pick-up electrodes inserted at selected positions within the field of influence of the charging current.

In the practice of the present invention, a pair of current electrodes are inserted into the ground on either side of a drill hole said electrodes being connected to suitable means furnishing current pulses of a selected time period. When the pulse of charging current is removed the resultant voltage is measured across a pair of pick-up electrodes one of which is inserted into the drill hole. The relative sign (+ or —) of the resultant voltage is utilized to establish the azimuth and dip of the subsurface scattered sulphide body relative to the drill hole.

When the scattered sulphide body lies within the field of influence of a low frequency charging current, the relative phase angle of the observed voltage drop across the pick-up electrodes becomes large; the tangent of the phase angle of such voltage being equal to the apparent dielectric constant $e$ multiplied by $2\pi$ times the frequency, $f$, of the charging current and divided by the apparent conductivity of the body $\sigma$. The sign of such phase angle is determinative of the azimuth and dip of the sulphide zone relative to the drill hole.

An object of this invention is the provision of apparatus and method for establishing the position of a disseminated sulphide body relative to a drill hole in the earth.

An object of this invention is the provision of a method of establishing the azimuthal position of a disseminated sulphide ore body relative to a drill hole said method comprising passing a pulse of current through the ground surrounding the drill hole, and measuring the resultant voltage appearing across a pair of pick-up electrodes after the termination of the current pulse, said pick-up electrodes having predetermined positions relative to the drill hole and the polarity of the said resultant voltage being taken as indicative of the relative position of the ore body.

An object of this invention is the provision of a method for establishing the azimuthal position of a subsurface ore body relative to a drill hole said method comprising passing a low frequency alternating current through the ground including the drill hole, and obtaining the resultant voltages appearing across a pair of pick-up electrodes having predetermined positions relative to the drill hole, the sign of the phase angle of the resultant voltages relative to the alternating current being indicative of the position of the ore body relative to the drill hole.

These and other objects and advantages will become apparent from the following detailed description when taken with the accompanying drawings. It will be understood the drawings are for purposes of illustration and are not to be construed as defining the scope or limits of the invention, reference being had for the latter purpose to the claims appended hereto.

In the drawings wherein like reference characters denote like parts in the several views:

Figure 1 is a sketch showing the double layer charge effects developed on a conducting sulphide particle disposed in an electric field;

Figure 2 illustrates a section of the ground through a drill hole and includes a block diagram of the apparatus and a graph showing the potential appearing across the pick-up electrodes as one of the latter is moved down the drill hole;

Figure 3 is a fragmentary view, similar to Figure 2, showing the practice of the invention to determine the dip of a scattered sulphide zone that is intersected by a drill hole; and Figure 4 is a diagram of the electrical apparatus and the electrodal disposition relative to the drill hole for the practice of the invention when a low frequency charging current is applied through the ground.

Reference is now made to Figure 1 wherein there is shown the surface 10 of the ground 11, the latter generally considered as a rock medium permeated by an electrolyte. Two charging current electrodes C, C₁, are inserted into the ground and connected to a suitable current source 12, said electrodes being spaced to either side of a subsurface sulphide particle 13. Consider a flow of direct current through the ground between the charging electrodes C and C₁ with the polarity as indicated, that is, positive charges tend to move through the ground from electrode C to electrode C₁. As described in United States Patent No. 2,611,004, issued September 16, 1952, to Arthur A. Brant and Everett A. Gilbert, work is done at the surface of the sulphide particle 13 where the conduction changes from ionic to electronic. The work or voltage drop at this boundary results by reason of the fact that a double layer charge is built up, in this case having the polarities shown by the plus (+) and minus (−) signs in Figure 1. In short, voltage drops occur at the metallic sulphide surfaces in the direction of the original, or charging, field.

If the charging field is suddenly removed the sulphide particle will act as a small charged dipole with its positive end nearer the charging electrode C. Such dipole will slowly discharge, after the charging current is cut-off, since the ion mobilities are small. If a volume of such sulphide particles is present between the charging electrodes C, C₁, they will behave as a single dipole with the positive charge toward the positive electrode C. The effect of such a dipole, that is, of such an aggregate of scattered sulphides, may be measured or recorded from 10 milliseconds to a second or so after the direct charging current has been cut off.

In the case of an alternating current passed through the ground between the charging electrodes, if the current frequency is low (1/10 to 25 cycles per second) the polarity of the electrode C can be positive relative to electrode C₁ for a significant duration of time. During this time the over-voltage charge effects, in the direction shown, can build up on the sulphide particle.

The double layer charge effects at either end of the sulphide particle act just like small condensers. The effect, then, of an aggregate of such particles, that is, of a scattered sulphide body, is to act as a condenser creating a voltage drop out-of-phase with the primary charging current. Such charge effects, or capacitive effects, decrease with the frequency of the charging current. The resulting voltage drop can be measured by means of a pair of pick-up electrodes inserted into the ground in the vicinity of the sulphide body and the relative phase angle of this voltage can be utilized to establish the azimuthal position of the sulphide body relative to a drill hole, as will be described in detail hereinbelow. For the moment, it is pointed out that the tangent of the phase angle $\theta$ of the resultant voltage is $$\frac{2\pi f \epsilon}{\sigma}$$

that is, $$\mathrm{Tan}\ \theta = \frac{2\pi f \epsilon}{\sigma}$$

where:

$f$ = the frequency of the charging current;
$\epsilon$ = the apparent dielectric constant of the region between the pick-up electrodes; and
$\sigma$ = the ground conductivity in mhos per meter.

This factor; namely, the tangent of the phase angle of the detected voltage, is high and remains relatively constant in the frequency range of 1/10 to 25 cycles per second. With increasing frequency ($f$) it is apparent that $\epsilon$, representing the above capacitive effects, is decreasing.

At relatively high charging current frequencies the over-voltage charge effects decrease and, in fact, disappear due to the slowness of the ion movement. At such higher frequencies true dielectric effects appear but these are not of interest for purposes of this invention since they are of uncertain diagnostic value. I have designated the apparent dielectric constant of the region under investigation by the symbol $\epsilon$ and it is here stressed that at charging current frequencies in the range of 1/10 to 25 cycles per second any out-of-phase voltage drop in the medium is not a true dielectric effect, but rather a charging phenomenon, as above described.

From the above description it is clear that charging can take place at scattered sulphide surfaces either with a D.-C. or low frequency A.-C. charging current and that the scattered sulphide particles between the grounded charging electrodes act in the aggregate as a charged dipole with the positive pole, or face, nearer the momentarily positive current electrode.

Reference is now made to Figure 2 which is a diagrammatic representation of the apparatus and electrodal arrangement relative to a drill hole. Here the drill hole 15 is shown vertical relative to the ground surface 10. It is here pointed out that the practice of my invention is not restricted to such specific disposition of the drill hole. More specifically, the drill hole may be inclined and may extend from any underground opening or reference surface. The charging electrodes are inserted into the reference surface equidistant on either side of the drill hole so that the axis of the drill hole lies essentially along the equipotential plane. The charging current is supplied by a conventional alternating current generator 16 which may be driven by a gasoline motor. The generator output is impressed across the input terminals of a power variac 17, the output terminals of which are connected to the primary winding 18 of a voltage step-up transformer 19. The high voltage of the secondary winding 20 is impressed across a suitable rectifier 21 capable of providing a D.-C. output up to approximately 3,000 volts and 5 amperes. A multi-vibrator 22 converts the rectified current into D.-C. pulses having a preselected time length, such current pulses being impressed through the rock medium 11 through the grounded charging electrodes C, C₁. The multi-vibrator is also arranged to switch the recorder 23 on and off in a selected timing sequence. More specifically, the recorder is inoperative during the time the charging direct current pulse is flowing through the medium and is switched into the operative condition approximately 10–50 milliseconds after the current pulse has been cut off. The voltage developed after removal of the charging current appears across the pick-up electrodes P, P₁ that are connected to the recorder 23 by cables 25 and 26, respectively. The pick-up electrode P₁ is inserted into the ground at a point relatively far distant from the drill hole in a plane that contains the drill hole and bisects at a right angle the line joining the charging electrodes C, C₁. In any case the electrode P₁ is kept far distant from the electrodes C and C₁ so that the potentials between each of the charging electrodes and P₁ are approximately equal and opposite and, in any case, small. The other pick-up electrode P is movable along the drill hole and for this purpose the connecting cable 25 may be carried by a reel 27.

For purposes of illustration, Figure 2 includes bodies 30, 31 which are aggregates of scattered or disseminated sulphides such as pyrite, galena, chalcopyrite, etc., disposed at opposite sides of the drill hole. If the instantaneous polarity of the charging electrodes is as indicated the charges of the aggregate bodies 30, 31 will be such that the positive surface will, in each case, be nearer the electrode C, as is also shown by the polarity markings adjacent to the bodies. The multi-vibrator permits such charging current pulse to flow for several seconds. Ten or more milliseconds after the pulse has been cut off, the multi-vibrator connects the recorder across the pick-up electrodes P, P₁. The purpose of the ten (10) millisecond delay is to afford sufficient time for the electromagnetic transient effects to disappear so that the voltage recorded by the recorder 23 is that due solely to the decay of the double layer charge effects of the sulphide particle surfaces. A second or two after the termination of the first pulse the multi-vibrator disconnects the recorder and impresses a second current pulse through the ground, such second pulse, however, being of reverse polarity. After several seconds the multi-vibrator cuts off the second pulse and ten or more milliseconds thereafter again connects the recorder to the pick-up electrodes. Simultaneously with the reversal of every other current pulse, the multi-vibrator reverses the connection of the recorder to the pick-up electrodes. In this way there is always maintained a fixed polarity relation between the charging electrode C and the pick-up electrode P.

Under normal conditions, since the drill hole lies essentially in an equi-potential plane, the voltage across the pick-up electrodes will be zero as the one pick-up electrode P is moved in discrete steps down the drill hole. However, when sulphide bodies are present a voltage will exist across the pick-up electrodes after the charging pulse is terminated, and the relative polarity and magnitude of such voltage is indicative of the position of the bodies relative to the drill hole.

When the charging current has an instantaneous polarity such that the electrode C is plus (+) and electrode $C_1$ is minus (—) the charges developed on the bodies 30, 31 are as shown in Figure 2. Since the sulphide body 30 lies between the drill hole and the charging electrode C the resultant voltage across the pick-up electrodes P, $P_1$, if any, will have a polarity such that the electrode P is negative (—). The curve of such voltage is shown by the curve A superposed on Figure 2 with the axis of the drill hole X the axis of abscessas and the line Y—O—Y the axis of ordinates. When the pick-up electrode P is directly opposite the body 30 the resultant voltage curve has a maximum value.

The lower body 31 lies between the drill hole and the charging electrode $C_1$. It is apparent that when the pick-up electrode P is opposite the body 31 the resultant voltage in the pulse-off interval will have a polarity such that the electrode P is positive (+) with respect to $P_1$. The curve B illustrates the shape of such voltage curve as the electrode P moves toward and beyond the level of the body 31.

The fact that each succeeding charging current pulse is of reverse polarity is immaterial since the polarity of the recorder 23 changes accordingly. It is the apparent sign of the recorded voltage which is the diagnostic factor.

Thus, when charging current pulses are used to produce polarization of the rock medium and charge effects at scattered or disseminated sulphide surfaces disposed within the medium, the azimuth of such surfaces may be found by detecting the sense of the decay voltage in the pulse-off time period by means of a pair of pick-up electrodes one of which is moved along a drill hole. When the charging electrodes are equi-spaced on either side of the drill hole then a negative sense of the decay voltage indicates that the scattered sulphides lie between the drill hole and the designated positive (+) current electrode. It is apparent now that to establish the quadrant of the scattered sulphide body it is only necessary to repeat the procedure with the charging electrodes C, $C_1$, lying on a line that passes through the drill hole and is at a right angle to their first positions.

The same technique can be applied to determine the component dip of a scattered sulphide zone crossing the drill hole. As shown in Figure 3, the sulphide body, or aggregate of disseminated sulphides, 35, has a component dip across the drill hole 36 from upper left to lower right. The pick-up, or potential, electrode P is moved down the hole as before and measurements are made of the decay, or after voltage in the pulse-off interval. The voltage across the pick-up electrodes as the electrode P is moved down the drill hole is shown in the curves C and D superposed on Fig. 3. If the decay voltage changes from negative to positive as the pick-up electrode is moved down the drill hole the scattered sulphide zone will have a component dip from the designated positive (+) charging electrode (in this case electrode C) downward toward the negative electrode. By swinging the charging electrodes to a position at right angles to that shown, and repeating the voltage measurements as the pick-up electrode is moved down the drill hole, it is apparent that the other dip component can be obtained. Combining the two components at right angles will give the direction of the resultant dip.

From the above azimuth and dip determinations it is clear that it is not necessary that the drill hole dip vertically. The drill hole may have any dip in a plane defined by the illustrated drill hole, Figures 2 and 3, and the perpendicular to the paper, without changing the practice of my invention. If the drill hole has a component dip in the plane of the paper or if the charging electrodes cannot be placed symmetrically to the hole, then the hole will no longer be on an approximately equi-potential surface and a certain amount of background or normal after-voltages will be present. These, however, may be corrected if the distances from the pick-up electrode P and the current electrodes C, $C_1$, are known as well as the primary voltage across the pick-up electrodes during the current on cycle. This, then, in no way changes the principles and procedures outlined hereinabove for the azimuth and dip determinations of disseminated or scattered sulphide zones or bodies.

It will now be shown that the same electrodal configuration and procedure can be used utilizing low frequency alternating current for charging the sulphide body.

Reference is now made to Figure 4 which is a sectional view of the earth similar to Figure 2 and including the apparatus required for the A.-C. version of the invention. The source of current comprises an oscillator 40 that may be set at any of a series of frequencies in the range of $\frac{1}{10}$ to 25 cycles per second. The oscillator current is amplified by a power amplifier 41 the output of which is fed to the charging electrodes C, $C_1$ through the respective cables 42, 43 and the calibrated potentiometer resistor 45. The voltage $V_2$ appearing across the output terminals of the potentiometer 45 is impressed upon a phase shift network 46 comprising the center tapped autotransformer 47, calibrated variable resistor 48 and fixed capacitor 49. The phase shift network permits shifting the phase of the voltage without change of amplitude. Such voltage is then applied to the grids of a differential amplifier 50 having its output connected to the primary winding of a coupling transformer 51.

The pick-up electrodes P and $P_1$ are similarly connected, by the cables 52, 53, to the grids of a similar differential amplifier 55 having its output connected to the primary winding of the coupling transformer 56. A suitable null detector 57 is connected to the secondary windings of the two coupling transformers 51, 56.

The null detector 57, therefore, indicates when the variable voltage $V_2$ (appearing across the potentiometer 45 and adjusted for phase by the network 46) is equal in magnitude and phase with the voltage $V_1$ (appearing across the pick-up electrodes). The magnitude of the voltage $V_2$ may readily be obtained from the setting of the calibrated potentiometer 45 and the known magnitude of the current flowing therethrough, that is, the charging current.

The phase angle $\theta$ of the voltage $V_1$ relative to $V_2$ is given by tan $\theta = \omega CR$ where:

$\omega = 2\pi f$, $f$ being the frequency of the charging current in cycles per second;

$C$ = the value of the capacitor 49 in farads; and $R$ = the value of the adjustable resistor 48 in ohms.

Now, $\omega$ may be fixed by using only certain selected frequencies as, for example, $\frac{1}{10}$, $\frac{1}{3}$, 1, 3, 10, etc., cycles per second. The value, of course, is fixed and known. Consequently, the adjustable resistor 48 may be calibrated to read tan $\theta$ directly for these selected frequencies.

The current density, J, in amperes per square meter in the ground is given by $$J = (\sigma + i\omega\epsilon)E = \sigma\left(1 + \frac{i\omega\epsilon}{\sigma}\right)E$$

where, $\sigma$ = the ground conductivity in mhos per meter;
$\omega = 2\pi f$;
$\epsilon$ = the apparent dielectric constant;
$E$ = the electric field in volts per meter; and
$i = \sqrt{-1}$, or the quadrature symbol.

It is apparent then, that $$\text{Tan } \theta = \frac{\omega \epsilon}{\sigma} = \frac{2\pi f \epsilon}{\sigma}$$

and that this quantity is diagnostic of the double layer charge effects such as develop at scattered sulphide occurrences in the medium at low charging current frequencies. The field procedure, then, is to select some frequency for the charging current in the range of $\frac{1}{10}$ to 25 cycles per second, move the pick-up electrode P to a series of select points in the drill hole and record from the setting of the calibrated resistor 48 the tangent $\theta$ of $V_1$ relative to $V_2$, such tangent $\theta$ equalling $$\frac{\omega \epsilon}{\sigma}$$

of the medium for the corresponding position of electrode P. From Figure 4 it is seen that the voltages $V_1$ and $V_2$ are compared so that the charging electrode C and the pick-up electrode P correspond in polarity. Hence, I designate the charging electrode C as the positive electrode for purposes of reference.

The plot of the factor $$\frac{\omega \epsilon}{\sigma}$$

along the drill hole and past the scattered sulphide bodies 30, 31 is shown by the curves F and G drawn with respect to the ordinates already described with reference to Figure 2. Opposite the upper body 30 the value of $$\text{Tan } \theta = \frac{\omega \epsilon}{\sigma}$$

has a negative value whereas this factor has a positive value opposite the lower body 31. Across a scattered sulphide zone dipping across the drill hole from the reference electrode C toward the electrode $C_1$ (as shown in Figure 3) tan $\theta$ or $$\frac{\omega \epsilon}{\sigma}$$

will be negative above and positive below the body.

Thus, for azimuth or dip determinations the sign of tan $\theta$ or $$\frac{\omega \epsilon}{\sigma}$$

when a low frequency charging current is used, conforms to the sign of the decay or after voltage when the charging current is a series of D.-C. pulses.

In summary, then, for the azimuthal location of a scattered sulphide body relative to a drill hole the rule is that the body lies toward the designated positive electrode when the decay voltage (in the case of D.-C. charging pulses) or the out-of-phase voltage (in the case of low frequency charging current) is negative. Similarly, for any such sulphide body crossing the drill hole, the component dip of the body is from the designated positive to the negative electrode when the decay voltage, or the out-of-phase voltage, changes from negative to positive as the movable pick-up electrode is moved through the body along the drill hole. In each case, a second set of readings taken with the electrodes arranged at a right angle to the first arrangement will give the quadrature azimuth location of the sulphide body or a second dip component from which the true dip of the inclined, intersected zone is established.

It is again pointed out that when D.-C. charging pulses are used the decay voltage is obtained from 10–50 milliseconds after the end of the charging pulse to thereby eliminate the spurious effect of transient electromagnetic phenomena. In the case of the low frequency charging current the value of the phase angle is obtained continuously and directly from the setting of the calibrated phase-shift network.

When practicing the invention with a pulsed, D.-C. charging current it is preferable to reverse the polarity of each succeeding current pulse to eliminate the effect of self potentials and current electrode polarization. While I have shown a recorder 23, Figure 2, for providing a record of the decay voltage upon termination of the D.-C. charging pulses it is apparent that a flux meter can be used to integrate the after-voltage during the pulse-off time period. Also, in place of the recorder, an oscilloscope can be used to record the whole or a portion of the decay curve of the after-voltage as the rock medium discharges.

Having now described my invention in detail in accordance with the requirement of the patent statutes, various changes and modifications will suggest themselves to those skilled in this art, and it is intended that such changes and modifications shall fall within the spirit and scope of the invention as recited in the following claims.

I claim:

1. A method for establishing the azimuthal position of a sub-surface scattered sulphide body relative to a drill hole, said method comprising inserting a pair of charging electrodes into exposed ground at points spaced from and on diametrically opposite sides of the drill hole, inserting a first pick-up electrode into the ground at a point relatively far removed from the drill hole and each of the charging electrodes, inserting a second pick-up electrode into the ground wall defining the drill hole, impressing a pulse of current through the charging electrodes and measuring the resultant voltage appearing across the pick-up electrodes immediately after the termination of the current pulse, moving the second pick-up electrode in discrete steps along the drill hole, and measuring the resultant voltage appearing across the pick-up electrodes immediately upon termination of a current pulse through the charging electrodes for each new position of the second pick-up electrode, the polarities of the said resultant voltages being indicative of the location of the sulphide body relative to the drill hole and either of the charging electrodes.

2. The method as recited in claim 1, wherein the two pick-up electrodes are disposed in a plane substantially normal to and bisecting the line joining the two charging electrodes.

3. The invention as recited in claim 2, wherein the recited steps are repeated but with the charging electrodes and the first pick-up electrode positioned 90 degrees from their first positions.

4. The method of establishing the component dip of a scattered sulphide zone crossing a drill hole, said method comprising inserting a pair of charging electrodes into exposed ground at points spaced from and on diametrically-opposite sides of the drill hole, inserting a first pick-up electrode into the ground at a point relatively far removed from the charging electrodes and the drill hole, inserting a second pick-up electrode into the ground defining the wall of the drill hole, applying a current pulse through the charging electrodes and obtaining the polarity of the resultant voltage appearing across the pick-up electrodes immediately after termination of the current pulse, moving the second pick-up electrode to a second position in the drill hole and again obtaining the polarity of the resultant voltage appearing across the pick-up electrodes immediately upon termination of a second current pulse applied through the charging electrodes, and repeating this procedure as the second pick-up electrode is moved down the drill hole and to the other side of the sulphide body, the sulphide zone being taken to dip from the positive charging electrode to the negative charging electrode when the voltage polarity of the second pick-up electrode changes from negative to positive as such electrode is moved down the drill hole.

5. The method for establishing the azimuthal location of a scattered sulphide body relative to a drill hole, said method comprising inserting a pair of charging electrodes into exposed ground at points spaced from and on diametrically opposite sides of the drill hole, inserting a first pick-up electrode into the ground at a point removed from the drill hole and the charging electrodes, inserting a second pick-up electrode into the ground defining a wall of the drill hole, impressing an alternating current through the charging electrodes said current having a fixed frequency in the range of $1/10$ to 25 cycles per second, measuring the tangent of the phase angle of the voltage appearing across the pick-up electrodes relative to the current through the charging electrodes, moving the second pick-up electrode along the drill hole in discrete steps and measuring the stated tangent of the phase angle for each position of such electrode, the sign of the tangent of the stated phase angle being indicative of the position of the body relative to the drill hole and one of the charging electrodes.

6. The invention as recited in claim 5, wherein the two pick-up electrodes are disposed in a plane substantially normal to and bisecting the line joining the two charging electrodes.

7. The invention as recited in claim 5, wherein the recited steps are repeated but with the charging electrodes and the first pick-up electrode positioned 90 degrees from their first positions.

8. The method of establishing the component dip of a scattered sulphide zone crossing a drill hole, said method comprising inserting a pair of charging electrodes into exposed ground at points spaced from and on diametrically opposite sides of the drill hole, inserting a first pick-up electrode into the ground at a point removed from the drill hole and the charging electrodes, one of the charging electrodes being taken as a reference electrode, inserting a second pick-up electrode into the ground defining a wall of the drill hole, impressing an alternating current through the charging electrodes said current having a fixed frequency within the range of $1/10$ to 25 cycles per second, measuring the tangent of the phase angle of the voltage appearing across the pick-up electrodes relative to the current passing through the charging electrodes, moving the second pick-up electrode down the drill hole in discrete steps and measuring the stated tangent of the phase angle for each position of such pick-up electrode, the directional component dip of the sulphide body being away from the reference charging electrode when the sign of the stated tangent of the phase angle changes from negative to positive as the second pick-up electrode is moved down the drill hole.

9. In apparatus for use in geophysical exploration comprising a pair of charging electrodes and a pair of pick-up electrodes insertable into the ground, the combination of a source of direct current, polarity-sensitive means connected to the pick-up electrodes and responsive to the voltage across such electrodes, pulsing means connected to the said current source and converting the direct current into a series of time-spaced current pulses, means reversing the polarity of successive current pulses, circuit elements applying the current pulses to the charging electrodes, means automatically disconnecting the said polarity-sensitive means from the pick-up electrodes during the time when current is flowing through the charging electrodes and connecting the polarity-sensitive means to the pick-up electrodes for a time period starting 10–50 milliseconds after the termination of each current pulse until the initiation of the next current pulse, and automatically means reversing the connection of the polarity-sensitive means in synchronism with the reversal of the current pulses.

10. Apparatus for use in geophysical exploration comprising a source of alternating current having a frequency variable between $1/10$ and 25 cycles per second, a pair of charging current electrodes connected to said source through a first adjustable resistor, a pair of pick-up electrodes connected to the input of a first differential amplifier, a phase-shift network including a second variable resistor and energized by the voltage across the said first variable resistor, a second differential amplifier energized by the output voltage of the phase-shift network, and a null detector energized by the output of both differential amplifiers.

11. The invention as recited in claim 10, wherein the phase-shift network includes a condenser of known value, and the said second variable resistor is calibrated directly in terms of the tangent of the phase angle between the voltage appearing across the pick-up electrodes and the voltage drop across the said first variable resistor at the selected frequency of the alternating current.

References Cited in the file of this patent

UNITED STATES PATENTS

| | | |
|---|---|---|
| 2,104,440 | Stratham et al. | Jan. 4, 1938 |
| 2,153,636 | Matsubara | Apr. 11, 1939 |
| 2,165,013 | Schlumberger | July 4, 1939 |
| 2,190,322 | Potapenko | Feb. 13, 1940 |
| 2,190,323 | Potapenko | Feb. 13, 1940 |
| 2,190,324 | Peterson | Feb. 13, 1940 |
| 2,611,004 | Brant et al. | Sept. 16, 1952 |